United States Patent [19]

Yi-Tung

[11] Patent Number: 4,799,459
[45] Date of Patent: Jan. 24, 1989

[54] ROBOT AGUA-FEEDER

[76] Inventor: Kao Yi-Tung, No. 75-10, Yi Choo Lii, Yen Sui Tseng, Tainai Shien, Taiwan

[21] Appl. No.: 76,115

[22] Filed: Jul. 21, 1987

[51] Int. Cl.⁴ ............................................. A01K 61/02
[52] U.S. Cl. ................................ 119/51.11; 446/175; 119/51 R
[58] Field of Search ...................... 119/51.11, 51 R, 3; 114/144 B, 144 RE; 210/923; 15/1.7; 446/175, 163, 164, 165

[56] References Cited

U.S. PATENT DOCUMENTS

| | | | |
|---|---|---|---|
| 3,130,803 | 4/1964 | Wiggins | 446/175 X |
| 4,662,854 | 5/1987 | Fang | 446/175 |

FOREIGN PATENT DOCUMENTS

| | | | |
|---|---|---|---|
| 387660 | 8/1973 | U.S.S.R. | 119/51 R |
| 0571227 | 9/1977 | U.S.S.R. | 119/3 |
| 0847962 | 7/1981 | U.S.S.R. | 119/3 |

Primary Examiner—Robert P. Swiatek
Assistant Examiner—R. Thomas Price
Attorney, Agent, or Firm—Ostrolenk, Faber, Gerb & Soffen

[57] ABSTRACT

This invention generally relates to a fully automatic operation system for feeder and more specifically to an unmanned apparatus which is fully automated so that the self-guiding, charging, and scheduled feed-spraying by the apparatus can be achieved. In accordance with the invention, the cooperation between a plurality of electric eyes and a control unit is utilized to command a plurality of motors for controlling the moving direction of the apparatus. A wharf having a charging device and a position device is also provided so that the batteries in the apparatus can be charged after each navigational turn on the apparatus.

5 Claims, 5 Drawing Sheets

ROBOT AGUA-FEEDER

BRIEF SUMMARY OF THE INVENTION

This invention generally relates to a completely automatic operation system for a feeder and more specifically to a novel unmanned apparatus which is fully automated so that it has the self-guiding, charging, and scheduled feed-spraying functions.

Due to their habitual nature, the shrimps under pond culture usually live widely scattered making it difficult to group feed them. Conventionally, in feeding, the feed must be sprayed uniformly over the whole pond. Each feeding operation, thus, is time-consuming and labor intensive. Depending on the size of the shrimp three to five feeding operations are necessary every day. Therefore, feeding operations have always incurred high cost.

It is, therefore, the principal object of the invention to provide an unmanned feeder which employs a plurality of motors to achieve propelling and steering functions and to achieve the guidance of the feeder by a plurality of photoelectronic sensors.

Another object of the invention is to provide a feeder which is under the command of a control unit and propelled by a plurality of motors so that it can automatically spray feed the shrimp/fish at selected timed intervals without any human management.

Yet another object of the invention is to provide a feeder which, in cooperation with a wharf, can automatically enter port, be positioned, and be charged so that its continuous navigating capability can be sustained to carry out feeding operations.

Yet another object of the invention is to provide a feeder which has automatic guiding, charging, and timed interval feed-spraying functions; and in which the control unit can be under the command of a remote control so that feed-spraying operations can be carried out in predetermined positions as desired.

These and other objects, features and advantages of the invention will become apparent to those skilled in the art when the description of the preferred embodiment is read in conjunction with the attached drawings.

DETAILED DESCRIPTION

Figure 1:
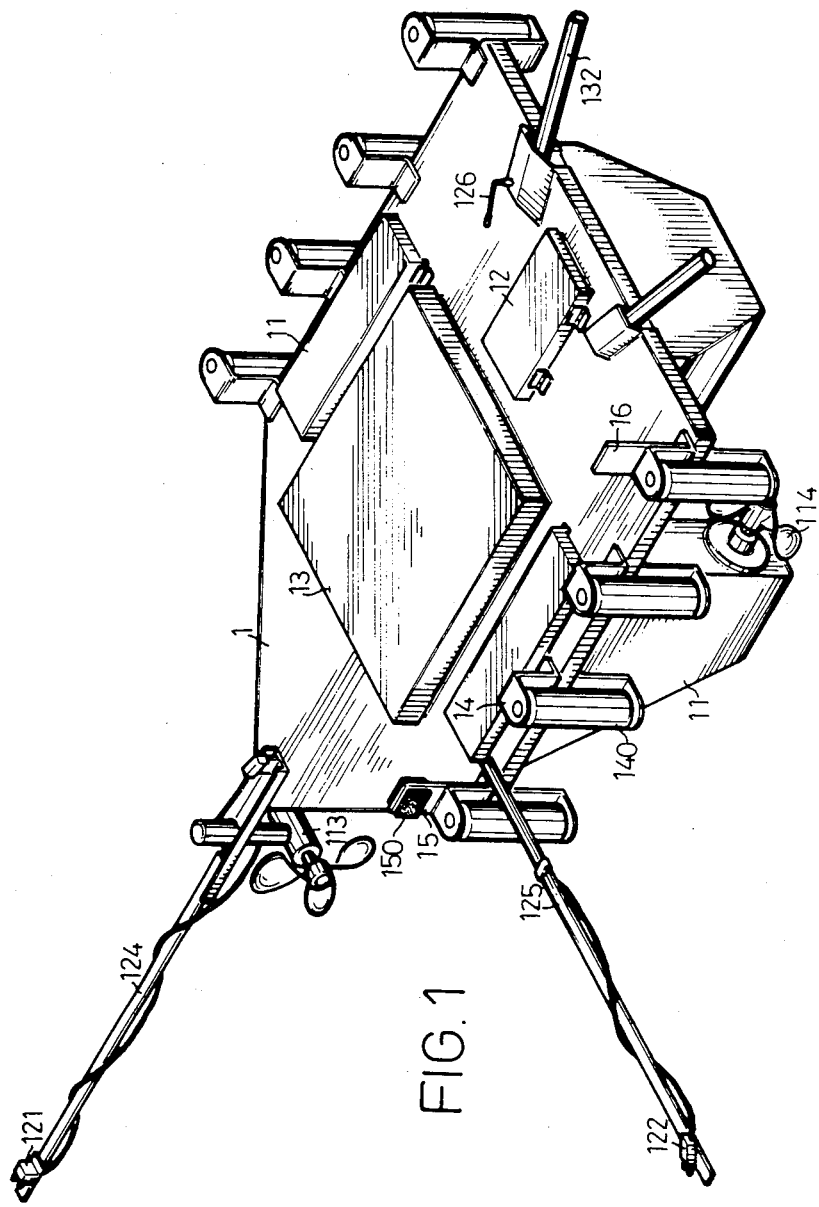
FIG. 1 is a view in perspective of the feeder in accordance with the invention.

Referring first to FIG. 1 which is a perspective view in accordance with the invention, the body 1 is capable of floating and is in the shape of a yacht or boat and is symmetrically provided with two power boxes 11 at the right and left sides thereof respectively for each holding the batteries (not shown) and propelling motors 111 and 112. At the outer rear ends of the power boxes 11 are respectively provided the right and left vane wheels 115 and 114 or propellers (wherein the right wheel is not shown) which are rotated in synchronization with the associated motors to drive the body, forward and backward. A steering motor 113 of the underwater type mounted in the direction perpendicular to the moving direction of the body 1 is also provided at the front end of the body 1. When the steering motor 113 is actuated, it turns the body gradually to the right. Two infrared photoelectric sensors 121 and 122 (also called electric eyes), having the distance sensitivity from about 1.5 to about 2 meters, are fixed at the front and left of the body 1 respectively by means of the supporting members 124 and 125. These sensors can transmit electronic signals at any time to the control unit 12 in the rear middle portion of the body 1.

Figure 2:
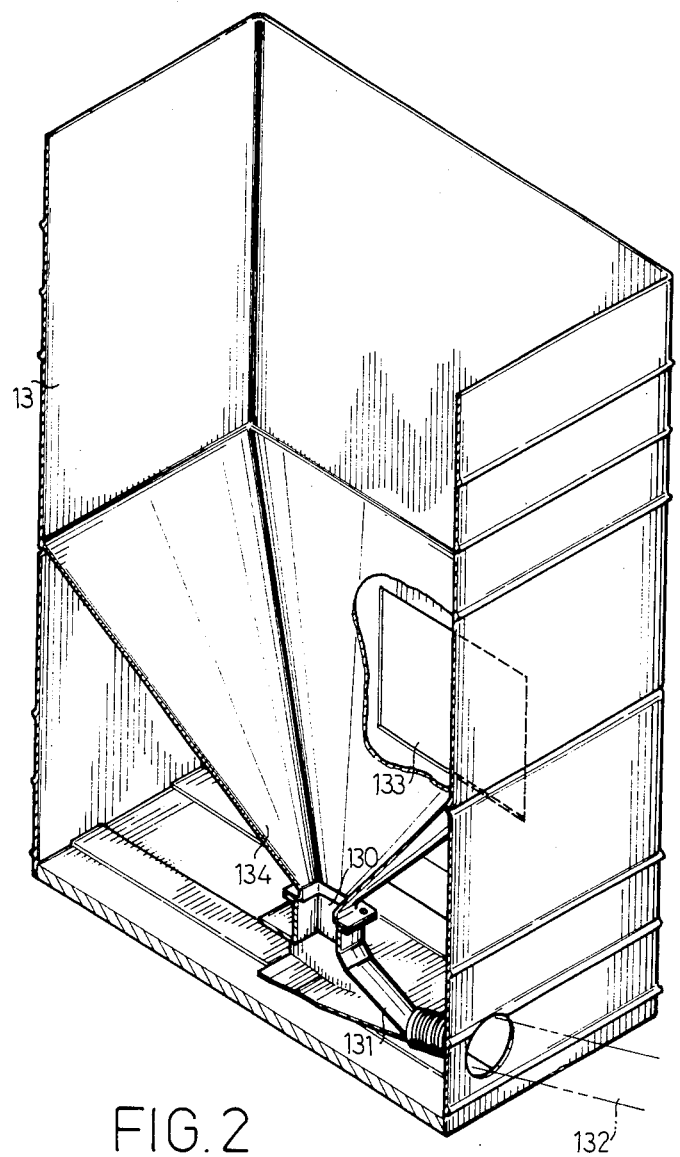
FIG. 2 is a view in perspective partly in cross-section of the spraying device in accordance with the invention.

As shown in the figure, each of the power boxes 11 as well as the control unit 12 is provided with a cover. In FIG. 1, a feed storage tank 13 is provided in the central portion of the body 1. Two conduits 132 divergently extend from the bottom of the tank 13 to the rear end of the body 1. Referring now additionally to the cross-sectional view of the tank 13 as shown in FIG. 2, the tank is a cubic-shaped container wherein integrally formed partitions 134 convergently extend from the appropriate middle portion of each of the walls to the bottom of the tank and define a narrow square opening 130 there. The lower end of the opening 130 is connected with a 3-way tube 131 of which two branches extend divergently to connect with the associated conduits 132 leading to the exterior, and another branch is connected to the outlet of a blower. Therefore, the feed from the feed-guiding rotation shaft mounted at the connection between the 3-way tube 131 and the opening 130 can be forcefully blown through the conduits 132 and uniformly distributed into the pool. However, this manner of feed-spraying is only slightly different from the conventional one. The invention is not characterized in this aspect, for clarity, space of the storage tank 13 to facilitate the operation of the blower.

Figure 3:
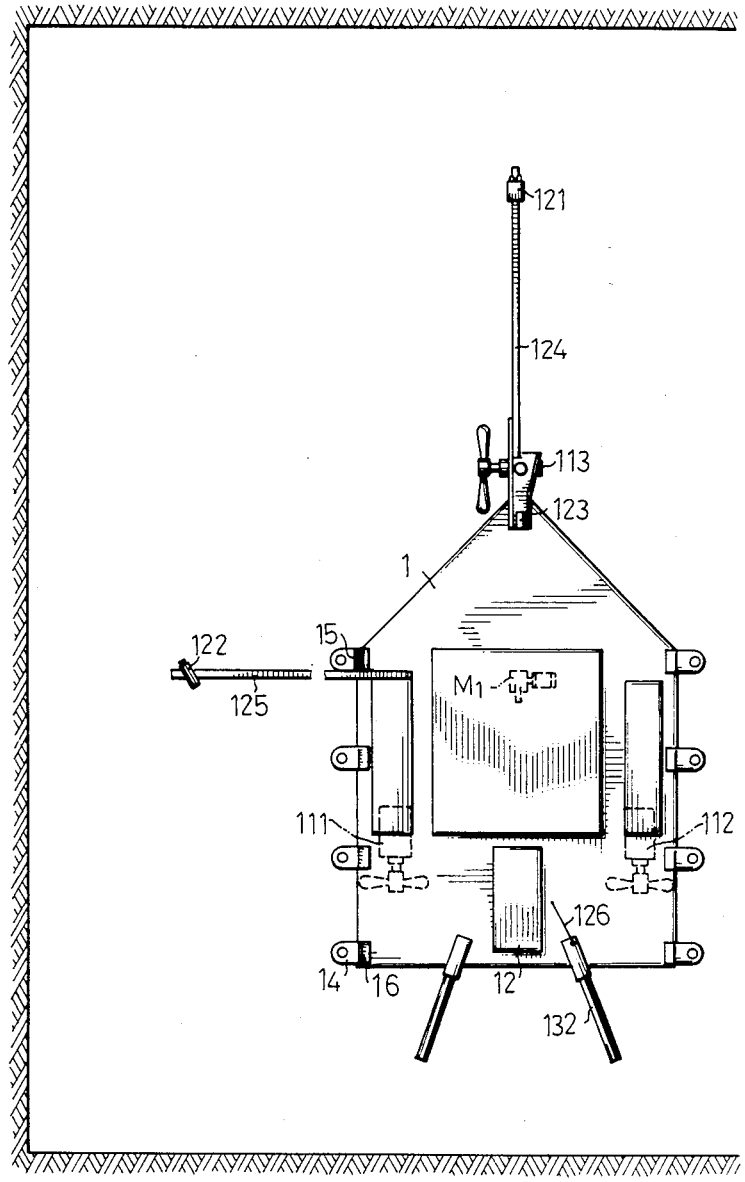
FIG. 3 is a schematic view showing the operation system in accordance with the invention.

Referring to FIG. 3 in addition to FIG. 1, the propelling motors 111 and 112, steering motor 113, and blower (designated by $M_1$) are supplied with power by a set of batteries, and are in cooperation with the infrared photoelectric sensors 121, 122, and 123 when under the command of the control unit 12. The left motor 111 is actuated by 12 volts of power supply, and the right motor 112 is actuated by 24 volts of power supply so that while the blower is operated to spray feed through conduits 132, the body 1 is always moving along the shore with a tendency of turning to the left. When the body is too near to the shore, the left electric eye 122 sends a signal to the control unit 12 so that the latter will command the right propelling motor 112 to reduce its rotation speed by receiving 12 volts of power supply and command the left propellintg motor 111 to increase its speed by receiving 24 volts of power supply. Thus, the body 1 will turn to the right during movement. When the body is to some degree remote from the shore, the left electric eye is deactuated. The propelling motors 111 and 112 are restored to their original power supply so that the body again moves with the tendency of turning to the left until the left electric eye 122 is actuated again. The effective distance of about 2 meters and the length of the supporting member 124 always keep the body at 3 to 4 meters from the shore. The body 1 will therefore move along the curve of the shore even if the curve is not smooth.

When the body 1 is moved forward (e.g. at the speed of about 1.2 to 1.5 m/s) and an obstacle or a portion of the shore is in front thereof, the forward electric eye 121 will be actuated and send a signal to the control unit 12. When it receives the signal, the control unit 12 at once commands the propelling motors to rotate in reverse direction so that the motion of the body 1 can be halted, and, simultaneously, the steering motor is actuated by 24 volts of power supply. The body 1 is then turned through an angle on the spot until the forward electric eye 121 is deactuated (i.e. until the body evades the obstacle). Again, the left electric eye 122 then carries out the guiding task. Since the effective distance from the body forward of the electric eye 121 is equal to that of the left electric eye 122, the body 1 wil be kept at 3–4 meters from the shore after turning to the right. Moreover, when the forward electric eye 121 is actuated and the control unit 12 commands the body 1 to turn toward the right, the operation of the blower is stopped to avoid spraying too much feed at the place where the body 1 in effect has no forward motion but stands still while it turns on the spot to evade the obstacle.

The control unit may also be connected with a receiving antenna 126 so that when necessary it can receive remote control signals from the land. The body thereby can be moved to the central portion of the pool and the feed can be sprayed there. When no further remote control signals are sent out, the body will restore to its automatic navigation. The control unit 12 is not described herein in detail because it involves only well-known automatic control principles.

Figure 4:
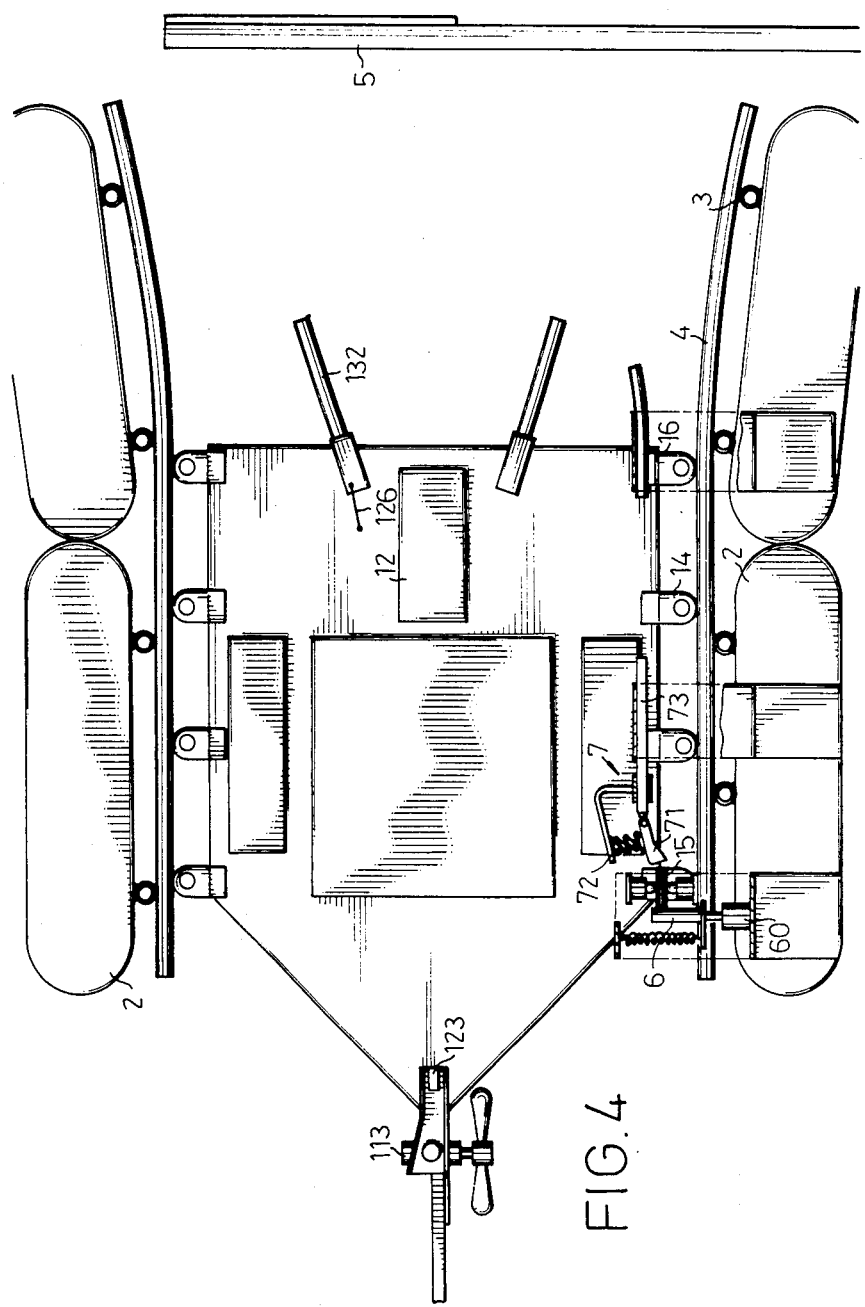
FIG. 4 is a schematic view of the wharf-positioning device in accordance with the invention.

Referring to FIG. 4 in addition to FIG. 1, a plurality of floats 2 is movably and slidably attached to a number of posts 3 arranged in two groups as shown in the figure to define a port. A metallic or plastic tube 4 is provided at the inner side of each group of post 3. The distance between the two tubes is slightly greater than the width of the body 1. A plurality of properly spaced pulleys 140 are provided at two sides of the body 1 as shwon in FIG. 1. Each pulley is rotatably mounted between two U-shaped clamping sheets 14 so that when the body 1 enters the port, a guiding and smoothly moving effect can be achieved through the contact between the pulleys 140 and the tubes 4. After the body 1 navigates and sprays feed for one turn along the shore, it passes a stopping rod 5 disposed at a predetermined position which causes the electric eye 123 to be actuated and send a signal to the control unit 12 so that the latter commands all motors 111, 112 and 113 to stop rotation and the blower M to stop spraying. Thus, the body 1 continues to move by its inertia energy and is then guided to enter the port. The control axis of the port is aligned with the original path of movement of the body 1 (which is at a specific distance away from the shore) whereby, the body 1 can slowly and properly enter the port. In addition, the guiding effect achieved by the pulleys can make the body 1 move in a stable and straight line.

A charging post 15 and an orienting post 16 are provided at the forward and rear ends respectively of the left side of the body 1. One of the floats 2 is provided with a positioning device 6 and a stop device 7, wherein the positioning device 6 is controlled by an electromagnet 60, and the stop device 7 is comprised of a one-way stop pin 71, a spring 72, and a directing tube 73. When the body 1 is sliding into the port, the charging post 15 first moves along the directing tube 73, then contacts and pushes against the stop pin 71. When the charging post has passed the stop pin 71, the latter is biased by the spring to abut against the charging post 15 so that the body 1 can be prevented from moving backward together with the water waves. At the same time, the forward end of the charging post 15 is restrained by the positioning device 6. In other words, the space between the positioning device 6 and the one-way pin 71 is exactly equal to the width of the charging post 15, and when the charging post 15 is positioned, the orienting post 16 properly abuts against the directing tube 73. This can help to prevent the body 1 from rolling.

Figure 5:
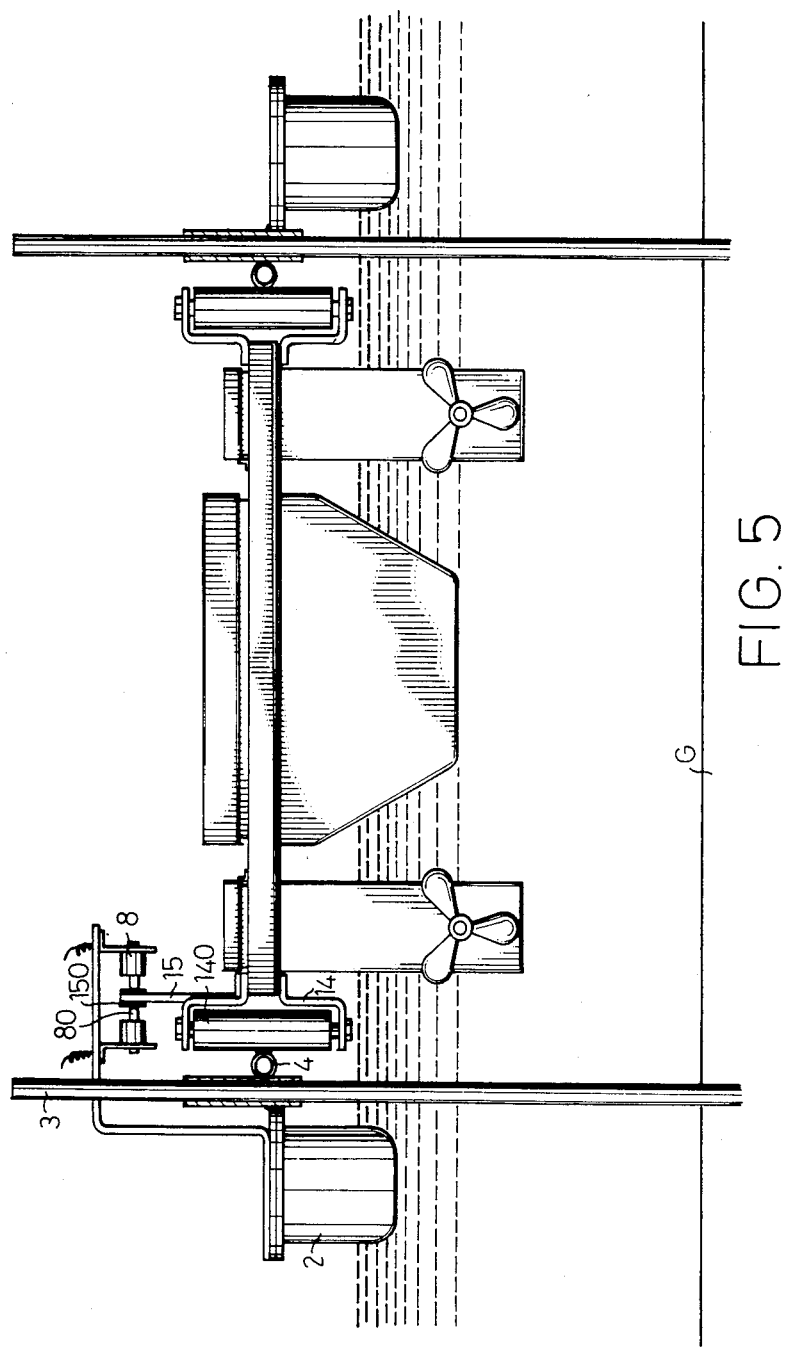
FIG. 5 is a schematic view illustrating the charging operation in accordance with the invention.

Referring to FIG. 5, the fixed posts 3 are inserted and fixed at the ground G. The floats 2 are always on the surface of the water and slide up and down along the respective posts. Thereby, said floats 2 can be positively engaged with the body 1 without the possibility of incurring errors due to the fluctuation of water level. Moreover, a set of chargers 8 is provided on a supporting member at the position corresponding to the charging post 15. The ends of the set of chargers are connected to the positive and negative poles on land respectively. A retractable and arcuate conductive terminal 80 protrudes from the fore end of each of the chargers. Two conductive plates 150, which are connected with the positive and negative poles of the set of batteries, are provided respectively on the opposite sides at the upper portion of the charging post 15. When the charging post 15 is retrained between the positioning device 6 and the one-way pin 71, the conductive plates 150 abut closely against the corresponding conductive terminals and thus the batteries can be charged. Each conductive plate 150 has a large area so that the elevational variation of the charging post due to the variation of the amount of the feed in the storage tank 13 (which affects the underwater depth of the body 1) does not affect the charging operation. An insulation cushion is provided between the conductive plates to avoid a short circuit.

As to the timed feed-spraying operation in accordance with the invention, it is controlled by the control unit 12. The charging period is predetermined by the pool size and quantity of young shrimps. For example, if the batteries are charged for three hours after each turn of navigation, then as long as the conductive terminals 80 are in contact with the respective conductive plates 150 when the body 1 has entered the port and positioned in place, the power supply on the land starts to charge the batteries. At this time, the timer (which is connected with the electromagnet 60) on the land and the control unit 12 are actuated simultaneously. After the 3 hour charging operation, the timer on the land commands the electromagnet 60 to attract the positioning device 6. Thereby, the positioning device is displaced and releases the body 1. At the same time, the control unit 12 commands the propelling motors 111 and 112 to rotate and propel the body so that the feed-spraying operation can be carried out. In this way, the batteries are charged one time after-each turn of navigation of the body such that the body can maintain its continuous navigation capability.

The body 1 can also be optionally provided with an automatic feed-filling device as desired. Morever, since the infrared light to be sensed by the electric eyes is invisible and will not be affected by morning fog, darkness, and heavy rain etc., the sensors can operate through whole day.

In conclusion, by the use of the fully automatized system in accordance with the invention, a lot of the management and labor costs can be saved, and the feed can be sprayed uniformly at everywhere of the pool surface. Obviously, the invention has industrial utility for the related industry.

Although a preferred embodiment of the invention has been described in detail, it should be understood that the various changes and modifications can be made therein without departing from the spirit and scope of the invention.

I claim:

1. An automatic guiding, charging, and timed feed-spraying feeder system, which comprises:
   a. a floatable main body; the body having sides and at each side thereof having a power box; batteries on the body; a propelling motor in each power box, the propelling motors connected with the batteries for being powered; the fore end carrying a steering motor; the steering motor being mounted in a direction perpendicular to the moving direction of the body;
   b. a forward supporting member extending forward from the body and a first photoelectric sensor mounted thereon;
   c. a sideward supporting member extending transversely from the body and a side photoelectric sensor mounted thereon;
   d. a central photoelectric sensor mounted at a central portion of the body;
   e. a control unit which is connected to the sensors to receive the signals from the photoelectric sensors and is connected to and controls the rotational speed of the motors;
   f. a feed storage tank in the central portion of the body, a narrow opening provided at the bottom of the tank; a blower, a 3-way tube having two branches connected with the exterior of the tank, and a third branch connected to the blower, the blower being also connected to and under the command of the control unit;
B. an automatic charging device including:
   a. fixed parts and a wharf which comprises two groups of floats movably and slidably attached to corresponding fixed posts, each of the posts being connected to a continuous tube extending along the wharf;
   b. a plurality of pulleys; the pulleys being movable and rotatably provided at the two sides of the body for cooperation with the tubes of the wharf;
   c. a charging post provided at the fore end of one side of the body; the charging post having two sides thereof on which are provided two conducting plates connected to the positive and negative poles of the batteries and an insulation cushion provided between the conductive plates;
   d. an orienting post provided at the rear end of the one side of the body;
   e. charging means comprising a set of conductive terminals which are connected to the positive and negative poles of the batteries and have arcuate shape, the charging means being attached to one of the floats and being arranged in the position corresponding to the conductive plates of the charging post;
   f. a magnetically controlled positioning device which forms a gate which be opened at timed intervals to allow the body to pass;
   g. a stop device engaging the body against backward movement and which comprises a one-way pin, a spring, and a directing tube, and which is in cooperation with the positioning device such that the conductive plates of the charging post can be positioned to contact the conductive terminals in carrying out the charging operation;
   h. a stopping rod placed for being sensed by the central photoelectric sensor which can send a signal to the control unit which then can command all the power from the batteries to the motors to be cut off;

whereby, owing to the cooperation between the photoelectric sensors and the control unit for commanding the motors to control the moving direction of the body, automatic guidance and timed feed-spraying are achieved; and the batteries in the body are charged after each navigational turn of the body to obtain the capability of continuous navigation.

2. The automatic guiding, charging, and timed feed-spraying feeder system according to claim 1, wherein the control unit is provided with a receiving antenna and a radio receiver connected to the control unit so that the moving direction of the body can be controlled by a remote control.

3. An automatic guiding, charging and timed feed-spraying feeder system comprising:

a floatable main body, the body having opposite sides; a respective propelling motor, including a propeller for the body, at each of the opposite sides of the body, the body having an end, a steering motor including a propeller mounted at the end of the body, the steering motor propeller being mounted in a direction perpendicular to the moving direction of the body; electric batteries connected with the motors for electrically powering the motors to operate;

at least one supporting member extending from the body and a photoelectric sensor mounted thereon for sensing the position of the body as it moves with respect to obstacles; a control unit for receiving siganls from the at least one photoelectric sensor, the control unit being connected with the motors for controlling the operation and speed of the motors for controlling the motion of the body and the turning of the body;

a storage tank for feed supported on the body, feed dispensing means supported on the body and operable for dispensing feed from the tank;

an automatic charging device for the electric batteries for the motors comprising:

a wharf at which the body is to be positioned for charging the batteries; cooperating positioning means at the wharf and on the body for positioning the body at the wharf for charging the batteries; electric charge receiving means provided on the body and connected with the batteries for delivering electric charge to the batteries for charging the batteries; electric charge providing means disposed at the wharf and positioned for engaging and contacting the charge receiving means on the body for supplying electric charge to the charge receiving means; and means for positioning the body at the wharf for receiving the charge for a time interval sufficient to charge the batteries.

4. The feeder system according to claim 3, wherein the means for dispensing feed comprises a blower communicating into the feed storage tank, and a conduit from the feed storage tank for transmitting feed blown from the tank by the blower; the blower being connected with the control unit for being operated by the control unit.

5. The feeder system according to claim 3, wherein the means for positioning comprises a magnetically controlled positioning device for the body which acts as a gate for maintaining the delivery of charge from the charge providing means to the charge receiving means for a predetermined time interval and for disengaging the charge providing means from the charge receiving means following the time interval, for permitting the body to move away from the wharf and continue the automatic feeding.

* * * * *